(12) United States Patent
Aust et al.

(10) Patent No.: US 10,913,389 B2
(45) Date of Patent: Feb. 9, 2021

(54) METHOD AND SYSTEM FOR INDICATING AN AUTONOMOUS KINEMATIC ACTION OF A VEHICLE

(71) Applicant: Volvo Car Corporation, Gothenburg (SE)

(72) Inventors: Mikael Ljung Aust, Västra Frölunda (SE); Trent Victor, Gothenburg (SE); Mikael Gordh, Yterby (SE); Tomas Omasta, Povazska Bystrica (SK); Fredrik Folkestad, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/454,297

(22) Filed: Jun. 27, 2019

(65) Prior Publication Data

US 2020/0001780 A1 Jan. 2, 2020

(30) Foreign Application Priority Data

Jul. 2, 2018 (EP) ..................................... 18181232

(51) Int. Cl.
*B60Q 1/22* (2006.01)
*B60Q 1/50* (2006.01)
*B60Q 5/00* (2006.01)
*G05D 1/02* (2020.01)

(52) U.S. Cl.
CPC ................. *B60Q 1/50* (2013.01); *B60Q 5/00* (2013.01); *G05D 1/021* (2013.01)

(58) Field of Classification Search
CPC ............. B60Q 1/50; B60Q 5/00; G05D 1/021
See application file for complete search history.

(56) References Cited

U.S. PATENT DOCUMENTS

| 10,144,346 | B1* | 12/2018 | Dohan | ................... B60Q 1/343 |
| 2016/0207449 | A1* | 7/2016 | Noble | ...................... B60Q 1/34 |
| 2016/0250963 | A1 | 9/2016 | Reuschel et al. | |
| 2017/0088035 | A1* | 3/2017 | Williams | ................. B60Q 1/50 |

(Continued)

OTHER PUBLICATIONS

Nissan Motor Corp., Nissan IDS Concept: Nissan's Vision for the future of EVs and autonomous driving., Oct. 27, 2015, pp. 1-6.

(Continued)

*Primary Examiner* — Phung Nguyen
(74) *Attorney, Agent, or Firm* — Clements Bernard Walker; Christopher L. Bernard

(57) ABSTRACT

The present disclosure relates to a method performed by an intention indicating system of a vehicle, for indicating to a potential observer an ongoing or impending autonomous kinematic action of the vehicle. The intention indicating system determines an ongoing or impending autonomous kinematic action of the vehicle. The intention indicating system further provides, with support from a light providing device including one or more light sources adapted to emit light, which light providing device is provided continuously and/or intermittently along a majority of a horizontal circumference of the vehicle, a visual light output visible at least from an outside of said vehicle representing the autonomous kinematic action. The disclosure also relates to an intention indicating system in accordance with the foregoing, and further to a vehicle including such an intention indicating system.

15 Claims, 4 Drawing Sheets

(56) References Cited

U.S. PATENT DOCUMENTS

2017/0240098 A1* 8/2017 Sweeney .................. B60Q 1/50

OTHER PUBLICATIONS

Karth Mahadevan et al., Communicating Awareness and Intent in Autonomous Vehicle-Pedestrian Interaction. Apr. 21, 2018, pp. 1-12.
Dec. 11, 2018 European Search Report issue on International Application No. EP18181232.

* cited by examiner

METHOD AND SYSTEM FOR INDICATING AN AUTONOMOUS KINEMATIC ACTION OF A VEHICLE

CROSS-REFERENCE TO RELATED APPLICATION

The present disclosure claims the benefit of priority of co-pending European Patent Application No. 18181232.2, filed on Jul. 2, 2018, and entitled "METHOD AND SYSTEM FOR INDICATING AN AUTONOMOUS KINEMATIC ACTION OF A VEHICLE," the contents of which are incorporated in full by reference for all purposes.

TECHNICAL FIELD

The present disclosure relates to an intention indicating system and a method performed therein, for indicating to a potential observer an ongoing or impending autonomous kinematic action of a vehicle.

BACKGROUND

Advances in autonomous vehicles enable computers or other electronic devices to drive vehicles. At least two types of autonomous vehicles exists today—semi-autonomous vehicles capable of operating in an autonomous mode with partial support of a human driver, and fully autonomous vehicles where no human driver interaction is needed.

Present day autonomous vehicles provide little, if any, notification of their intentions in a discernible form to an external observer, such as a human. The signaling methods that are currently built into vehicles, such as turn signals and brake lights, only provide the ability to communicate a small subset of information. This makes it challenging for people or systems near such an autonomous vehicle to plan their behavior or react to the behaviors of the autonomous vehicle. As the number of autonomous vehicles increases, so does the need for improved communication methods between the autonomous vehicles and external observers.

US20150336502 A1, for instance, discloses an approach of communications between autonomous vehicles and humans, and describes how human understandable output expressly or implicitly indicating an intended course of action of a vehicle, may be conveyed via a vehicle output device. However, although US20150336502 A1 provides a solution enabling an autonomous vehicle to provide a comprehensive means for signaling external observers, a need for alternative and/or improved communication methods between the autonomous vehicles and external observers, remains.

SUMMARY

It is therefore an object of embodiments herein to provide an approach for in an improved and/or alternative manner indicate to a potential observer an ongoing or impending autonomous kinematic action of a vehicle.

According to a first aspect of embodiments herein, the object is achieved by a method performed by an intention indicating system of a vehicle, for indicating to a potential observer an ongoing or impending autonomous kinematic action of the vehicle. The intention indicating system determines an ongoing or impending autonomous kinematic action of the vehicle. The intention indicating system further performs—with support from a light providing device including one or more light sources adapted to emit light, which light providing device is provided continuously and/or intermittently along a majority of a horizontal circumference of the vehicle—a visual light output visible at least from an outside of the vehicle representing the autonomous kinematic action.

Thereby, an approach is provided according to which people—or even other autonomous vehicles and/or systems—near such a vehicle, are enabled to plan their behavior or react to the behaviors of the vehicle. That is, since an ongoing or impending autonomous kinematic action of the vehicle is determined, it is established that there is a current or upcoming autonomous intention of said vehicle. Moreover, that is, since there is provided—with support from a light providing device including one or more light sources adapted to emit light, which light providing device is provided continuously and/or intermittently along a majority of a horizontal circumference of the vehicle—a visual light output visible at least from an outside of the vehicle representing the autonomous kinematic action, a light emission indicative of the autonomous kinematic action is emitted with support from one or more light sources distributed along the vehicle. Thereby, with the light providing device extending along at least a substantial portion of the vehicle's circumference, said light providing device may be viewable from essentially all horizontal angles, i.e. the light providing device may be observable to an observer such as an external observer viewing the vehicle from any direction. Accordingly, light outputs associated with autonomous kinematic actions may be more easily noticed by observers, which is a clear advantage over prior art technology for which many angles are hidden. Furthermore, with the light providing device including one or more light sources—such as a plurality of light sources—and extending along at least a substantial portion of the vehicle's circumference, a greater variety of light output combinations representing different autonomous kinematic actions may be supported. That is, different autonomous kinematic actions may be represented by different types of light outputs, with each respective light output adapted to in an intuitive and/or human understandable manner signal the type of autonomous kinematic action it represents. Consequently, with the inventive concept, an ongoing or upcoming autonomous kinematic action may be communicated to an observer such as an external observer in an improved and intuitive manner, i.e. an observer may in an improved and intuitive manner perceive, derive and/or judge the ongoing or upcoming autonomous kinematic action and/or the type thereof.

For that reason, an approach is provided for in an improved and/or alternative manner indicate to a potential observer an ongoing or impending autonomous kinematic action of a vehicle.

The technical features and corresponding advantages of the above mentioned method will be discussed in further detail below.

By introducing a method performed by an intention indicating system of a vehicle, for indicating to a potential observer an ongoing or impending autonomous kinematic action of the vehicle, an approach is provided according to which people—or even other autonomous vehicles and/or systems—near such a vehicle, are enabled to plan their behavior or react to the behaviors of the vehicle. "Vehicle" may refer to "autonomous vehicle" or "fully or semi-autonomous vehicle", and the vehicle may support at least semi-autonomous driving as commonly known in the art. For instance, the vehicle may be equipped with various sensors, such as cameras, radars, and/or lidar etc., that gather data concerning the vehicles surroundings. Based on this data and assigned task(s), the vehicle may, as commonly known, plan an intended course of action. The vehicle may further refer to any arbitrary vehicle intended for a public transport network, for instance an engine-propelled or electrically-powered vehicle such as a car, truck, lorry, van, bus, or a rail-bound vehicle such as e.g. a train or tram. The expression "for indicating" may refer to "for indicating in an intuitive or human understandable manner or form", whereas "indicating" may refer to "conveying, communicating and/or signalling". "Observer" may refer to "external observer", and further to "road user and/or human being", for instance a vulnerable road user such as a pedestrian, cyclist etc. According to an example, "observer" may further refer to "human and/or a sensor of e.g. another autonomous vehicle". Moreover, "potential observer" may refer to merely "observer". "Kinematic" action may refer to "driving-related, driving behaviour and/or movement-related" action, whereas "action" may refer to "vehicle movement, vehicle intention and/or vehicle task. "Ongoing" may refer to "current", whereas "impending" may refer to "upcoming, forthcoming and/or imminent".

Since the intention indicating system determines an ongoing or impending autonomous kinematic action of the vehicle, it is established that there is a current or upcoming autonomous intention of said vehicle. Determining the ongoing or impending autonomous kinematic action may be accomplished as commonly known in the art, e.g. by deriving data holding such information from the vehicle, for instance retrievable from one or more electronic control module(s). "Determining" the autonomous kinematic action may refer to "deriving and/or retrieving information about" the autonomous kinematic action.

Since the intention indicating system provides—with support from a light providing device including one or more light sources adapted to emit light, which light providing device is provided continuously and/or intermittently along a majority of a horizontal circumference of the vehicle—a visual light output visible at least from an outside of the vehicle representing the autonomous kinematic action, a light emission indicative of the autonomous kinematic action is emitted with support from one or more light sources distributed along the vehicle. Thereby, with the light providing device extending along at least a substantial portion of the vehicle's circumference, said light providing device may be viewable from essentially all horizontal angles, such as from around 360 degrees of the vehicle, i.e. the light providing device may be observable to an observer such as an external observer viewing the vehicle from essentially any direction, such as e.g. from the front, back and any of the sides thereof. Accordingly, light outputs associated with autonomous kinematic actions may be more easily noticed by observers, which is a clear advantage over prior art technology for which many angles are hidden. Furthermore, with the light providing device including one or more light sources—such as a plurality of light sources—and extending along at least a substantial portion of the vehicle's circumference, a greater variety of light output combinations representing different autonomous kinematic actions may be supported. That is, different autonomous kinematic actions may be represented by different types of light outputs, with each respective light output adapted to in an intuitive and/or human understandable manner signal the type of autonomous kinematic action it represents. Consequently, with the inventive concept, an ongoing or upcoming autonomous kinematic action may be communicated to an observer such as an external observer in an improved and intuitive manner, and subsequently, an observer may in an improved and intuitive manner perceive, derive and/or judge the ongoing or upcoming autonomous kinematic action and/or the type thereof.

The light providing device, which according to an example may be represented by a "light band", may be of any arbitrary width—such as in a direction from the vehicle floor to the vehicle roof—considered appropriate, e.g. in view of design in combination with visibility, and may for instance range from 2 mm up to 500 mm. The width of the light providing device may further vary along the horizontal circumference of the vehicle. The light providing device may be arranged at any arbitrary height—such as in a direction from the vehicle floor to the vehicle roof—of the vehicle considered appropriate, e.g. in view of design in combination with visibility, anywhere between floor level up to roof level. Moreover, the light providing device may at least partly be visible from an inside of the vehicle, e.g. by being at least partly transparent and/or translucent, whereby the light output in addition to being visible from an outside of the vehicle, additionally may be visible from within the vehicle.

The light providing device may include any number of light sources considered appropriate, for instance ranging from one up to several hundreds, or even several thousands. The light source(s) may be distributed along the light providing device in any arbitrary manner, e.g. evenly or unevenly distributed. According to an example, the light providing device includes at least three light sources on each side of the vehicle and at least two light sources in the front and rear respectively. The light sources may be represented by any arbitrary light providing sources known in the art, e.g. LEDs, lasers and/or bulbs, and/or equivalents or successors thereof. The light output may involve light emission from one or more of the light sources of the light providing device, in any arbitrary combination considered intuitive and/or human understandable to reflect the autonomous kinematic action it represents. The light output may accordingly involve light emission from one or more light sources one at a time, simultaneously, in combination, in series etc., and may further be represented by e.g. steady light, pulsating light, light of varying brightness, intensity and/or colour etc. A respective light emission duration of a light source may be arbitrarily selected, for instance range from 10 ms up to several minutes or even hours. Moreover, the light output may be repeated, e.g. continuously, for instance with a repetition rate ranging from 0.1 s up to several minutes or even hours.

"Providing" a light output may refer to "initiating, communicating, signalling and/or conveying" a light output. Provided "continuously" on the other hand may refer to provided "without interruption", whereas provided "intermittently" may refer to provided "spaced apart", e.g. spaced apart with any arbitrary distance, such as ranging from 0.1 mm up to 5000 mm. "A majority" of a circumference may refer to "more than 50 percent" of a circumference, whereas "horizontal circumference" may refer to "essentially horizontal circumference" and/or "circumference in a horizontal plane or an essentially horizontal plane when the vehicle is standing on flat ground". The essentially horizontal circumference may accordingly have a slight inclination as compared to a true horizontal circumference, for instance have an inclination of up to 30 degrees as compared to a horizontal plane when the vehicle is standing on flat ground. "Horizontal circumference of the vehicle" may according to an example refer to "horizontal circumference of an exterior and/or interior surface of the vehicle", where "exterior and/or interior surface" may refer to merely "exterior and/or interior". The light providing device may for instance at least partly be flush or essentially flush with the exterior surface and/or an interior surface of the vehicle. Visual light "output" may refer to visual light "emission", and "output" may further refer to "output combination, output session, output sequence, output series and/or output scheme". "Output" may further refer to "pulse series". "Visible at least from an outside of" the vehicle may refer to "visible and/or viewable at least exterior of" the vehicle, whereas "an outside of" the vehicle may refer to merely "outside" the vehicle. "Representing" the autonomous kinematic action on the other hand may refer to "indicative of, associated with, reflecting, communicating, and/or signalling" the autonomous kinematic action, and further to "representing the type of" the autonomous kinematic action. According to an example, "representing" the autonomous kinematic action may further refer to "representing in an intuitive manner and/or human understandable manner" the autonomous kinematic action.

Optionally, the light providing device may preferably extend along at least 75 percent, more preferred along at least 85 percent, and most preferred along at least 95 percent of the horizontal circumference. Thereby, the light providing device to even greater extent covers essentially an entire circumference of the vehicle, thus enabling for light outputs associated with autonomous kinematic actions to even more easily be noticed by observers and further enabling for an even greater variety of light output combinations representing different autonomous kinematic actions, to be supported.

Optionally, the providing of the light output may be initiated a predeterminable period of time prior to the autonomous kinematic action starting. Thereby, the autonomous kinematic action may be started to be communicated ahead of time, i.e. prior to the vehicle actually starting to perform said action. This gives an observer advance information of the action, and enables said observer to plan his or her behavior and/or react to the behaviors of the autonomous vehicle ahead of time. The period of time may be arbitrarily selected, for instance depending on the type of autonomous kinematic action to be performed, and may e.g. range from 0.5 s up to 10 s. "Predeterminable period of time" may refer to "predetermined period of time" or merely "period of time", whereas "initiated" may refer to "started". "Prior to" may refer to "ahead of and/or before", whereas autonomous kinematic action "starting" may refer to autonomous kinematic action "being performed and/or being initiated".

Optionally, the light output may be active for a predeterminable period of time and/or until the autonomous kinematic action is finalized. Thereby, the autonomous kinematic action may be communicated either during a selected period of time or until said action no longer is active and/or relevant. This gives an observer information about the action during a sufficient time period, and enables said observer to plan his or her behavior and/or react to behaviors of the autonomous vehicle accordingly. The period of time may be arbitrarily selected, for instance depending on the type of autonomous kinematic action to be performed, and may e.g. range from 0.5 s up to several minutes or even hours. "Predeterminable period of time" may refer to "predetermined period of time" or merely "period of time". "Active" for a predeterminable period of time may refer to "ongoing and/or emitting" for a predeterminable period of time, whereas the expression autonomous kinematic action "is finalized" may refer to the autonomous kinematic action "ends and/or no longer is active, ongoing or valid". According to an example, the expression "is active for a predeterminable period of time and/or until" the autonomous kinematic action is finalized may refer to "ends and/or is aborted after a predeterminable period of time and/or when" the autonomous kinematic action is finalized.

Optionally, the autonomous kinematic action may include a lateral movement. Thereby, said action may be represented by the vehicle e.g. changing lanes and/or turning.

According to an example, when the autonomous kinematic action includes a lateral movement to the left, the light output may then include light emission from one or more light sources of the light providing device on the left side of the vehicle. Thereby, with the light providing device emitting light on the vehicle's left side, the autonomous kinematic action of the vehicle turning left and/or e.g. changing to a lane to the left, is communicated to an observer in an intuitive and easily viewable manner. Correspondingly, optionally, when the autonomous kinematic action includes a lateral movement to the right, the light output may then include light emission from one or more light sources of the light providing device on the right side of the vehicle. Thereby, with the light providing device emitting light on the vehicle's right side, the autonomous kinematic action of the vehicle turning right and/or e.g. changing to a lane to the right, is communicated to an observer in an intuitive and easily viewable manner.

Additionally or alternatively, optionally, the autonomous kinematic action may include a transition from a shut down state to a standstill state. Thereby, said action may be represented by the vehicle changing mode from an off state and/or engine off state to an idle state where the vehicle may be on but standing still, such as e.g. prior to driving off.

According to an example, the light output may then include light emission from one or more light sources of the light providing device as considered appropriate to imitate and/or resemble a behaviour of "waking up". For instance, the light output may include light emitted in a pulsating manner, such as to imitate heartbeats and or breathing, for instance pulsating with an increasing pace. Alternatively, light may be emitted such as the light output appears to wander around the vehicle, for instance with increasing pace. Thereby, the autonomous kinematic action of the vehicle transitioning from a shut down state to a standstill state is communicated to an observer in an intuitive and easily viewable manner. "Standstill" state may refer to "idle and/or standby" state and/or "active and/or awake, but non-moving" state.

Additionally or alternatively, optionally, the autonomous kinematic action may include a transition from the standstill state to the shut down state. Thereby, said action may be represented by the vehicle changing mode from an idle state where the vehicle may be on but standing still, to an off state and/or engine off state. According to an example, the light output may then include light emission from one or more light sources of the light providing device as considered appropriate to imitate a behaviour of "going to sleep". For instance, the light output may include light emitted in a pulsating manner, such as to imitate heartbeats and or breathing, for instance pulsating with a decreasing pace such as to imitate and/or resemble falling asleep. Alternatively, light may be emitted such as the light output appears to wander around the vehicle, for instance with decreasing pace.

Thereby, the autonomous kinematic action of the vehicle transitioning from the standstill state to the shut down state is communicated to an observer in an intuitive and easily viewable manner.

Additionally or alternatively, optionally, the autonomous kinematic action may include going rearwards. Thereby, said action may be represented by the vehicle reversing. According to an example, the light output may then include light emission from one or more light sources of the light providing device as considered appropriate to signal a "backing up warning". For instance, the light output may include light emitted in a blinking manner, such as to imitate and/or resemble a warning. Thereby, the autonomous kinematic action of the vehicle going rearwards is communicated to an observer in an intuitive and easily viewable manner.

Additionally or alternatively, optionally, the autonomous kinematic action may include a steady state movement. Thereby, said action may be represented by the vehicle being in a static and/or status quo driving state, and according to an example, the light output may then include light emission from one or more light sources of the light providing device as considered appropriate to signal "unchanged driving circumstances". For instance, the light output may include emitting a continuous soft and/or low intensity light, such as to signal a non-changing driving situation. Thereby, the autonomous kinematic action of the vehicle in steady state movement is communicated to an observer in an intuitive and easily viewable manner. "Steady state movement" may refer to "steady state forward movement".

Additionally or alternatively, optionally, the autonomous kinematic action may include an acceleration. Thereby, said action may be represented by an acceleration of the vehicle. According to an example, the light output may then include light emission from one or more light sources of the light providing device as considered appropriate to signal "increasing speed". Additionally or alternatively, the autonomous kinematic action may optionally include a deceleration. Thereby, said action may be represented by a deceleration of the vehicle. According to an example, the light output may then include light emission from one or more light sources of the light providing device as considered appropriate to signal "decreasing speed and/or slowing down".

According to an example, the light providing device may include—on a respective left and right side of the vehicle—at least a first, a second and a third light source, which first light source is positioned in front of the second light source in a forward direction of the vehicle, and which second light source is positioned in front of the third light source in said forward direction. When the autonomous kinematic action then includes an acceleration, then the light output may include light emission from the first light source—on the left and/or right side—at a first time instant, light emission from the second light source—on the left and/or right side—at a second time instant subsequent the first time instant, and light emission from the third light source—on the left and/or right side—at a third time instant subsequent the second time instant. Thereby, with the at least first, second and third light sources emitting light in this specified order—which may be perceived as the light output moving in a backward direction of the vehicle—the autonomous kinematic action of vehicle acceleration is communicated to an observer in an intuitive and easily viewable manner.

Correspondingly, according to another example, when the autonomous kinematic action then includes a deceleration, then the light output may include light emission from the third light source—on the left and/or right side—at a first time instant, light emission from the second light source—on the left and/or right side—at a second time instant subsequent the first time instant, and light emission from the first light source—on the left and/or right side—at a third time instant subsequent the second time instant. Thereby, with the at least first, second and third light sources emitting light in this specified order—which may be perceived as the light output moving in a forward direction of the vehicle—the autonomous kinematic action of vehicle deceleration is communicated to an observer in an intuitive and easily viewable manner.

The light output may be continuously repeated, e.g. with a repetition rate ranging from 0.1 s up to 5 s. Moreover, the respective light emission duration of the at least first, second and third light source may be arbitrarily selected, for instance respectively range from 10 ms up to 5 s. Furthermore, light emissions from the respective light sources may at least to some extent overlap, i.e. a duration of the first light emission may partially overlap a duration of the second light emission, and correspondingly, a duration of the second light emission may partially overlap a duration of the third light emission. Additionally or alternatively, the at least first, second and third light sources may respectively emit light one at a time, i.e. provide non-overlapping light emission. The type of light emission from the respective at least first, second and third light source may be arbitrarily selected as considered appropriate, for instance be represented by steady light, pulsating light, light of varying brightness, intensity and/or colour etc. According to an example, the first light source may be represented by a plurality of light sources, the second light sources be represented by a plurality of light sources and/or the third light source be represented by a plurality of light sources, such as LEDs. The expression "on a respective left and right side of the vehicle" may refer to "on a side of the vehicle, being a left and a right side".

Optionally, the intention indicating system may further determine that an observer is in vicinity of the vehicle. Thereby, the autonomous kinematic action is only indicated—such as the light output only provided—when it is determined that someone is near the vehicle. That is, the autonomous kinematic action is only indicated when there is a possibility that someone may observe said indication. Accordingly, in this scenario, the autonomous kinematic action is only indicated when deemed relevant, and consequently, unnecessary and/or excessive indicating may be avoided. Detecting that an observer is within vicinity of the vehicle may be accomplished as commonly known in the art, e.g. by means of one or more sensors or detection sensors such as e.g. a camera, radar, laser, lidar etc., adapted for sensing presence of e.g. a human and/or another vehicle. "Determining" may in this context refer to "sensing", whereas "in vicinity of the vehicle" may refer to "close to, near and/or within a predeterminable distance from said vehicle, such as within 0 to 200 metres thereof, e.g. depending on a velocity of the vehicle".

Optionally, the intention indicating system may further perform a vertical vehicle motion representing the autonomous kinematic action, which vertical vehicle motion includes raising and/or lowering a front portion and/or a rear portion of a vehicle body of the vehicle. Thereby, by additionally raising and/or lowering a front portion and/or a rear portion of a vehicle body of the vehicle in a manner reflecting the autonomous kinematic action, said autonomous kinematic action may to even greater extent be signalled in an intuitive and attention grabbing manner, and to even further extent be easily noticed by observers such as external observers. That is, different autonomous kinematic actions may be represented by different types of vertical vehicle motions of the vehicle body, with each respective vertical vehicle motion adapted to in an intuitive and/or human understandable manner signal the type of autonomous kinematic action it represents. The vertical vehicle motion may, for instance, when the autonomous kinematic action includes a transition from the standstill state to the shut down state, include lowering the vehicle body front portion and rear portion, hence the entire vehicle body. Additionally or alternatively, the vertical vehicle motion may, when the autonomous kinematic action includes a transition from the shut down state to the standstill state, include raising the vehicle body front portion and rear portion, hence the entire vehicle body. Additionally or alternatively, the vertical vehicle motion may, when the autonomous kinematic action includes an acceleration, include raising the front portion and/or lowering the rear portion. Additionally or alternatively, the vertical vehicle motion may, when the autonomous kinematic action includes a deceleration, include lowering the front portion and/or raising the rear portion. Consequently, by additionally communicating the ongoing or upcoming autonomous kinematic action by means of a vertical vehicle motion of the vehicle body reflecting the type of the action, said action may be communicated to an observer in an—to even greater extent—improved and intuitive manner, and subsequently, an observer may—to even greater extent—in an improved and intuitive manner perceive, derive and/or judge the ongoing or upcoming autonomous kinematic action and/or the type thereof. The vertical vehicle motion may refer to a vertical movement in relation to the ground on which the vehicle is situated, such as a movement along a normal to the ground. That is, "vertical" is related to the vehicle assumed to be on a flat horizontal ground; if the ground is inclined, the vertical direction will change accordingly. "Vertical vehicle motion" may refer to "essentially vertical vehicle motion", i.e. the vertical vehicle motion may to some extent differ from movement along the normal to the ground, for instance by up to 45 degrees. To what extent the front and/or rear portion of the vehicle body is raised and/or lowered, may be arbitrarily selected, e.g. based on the vehicle platform the vehicle is built on and/or the type of autonomous kinematic action the vertical vehicle motion is representing. According to an example, the front and/or rear portion of the vehicle body may be raised in the range of 5 mm up to 500 mm. The vehicle body is however preferably not raised and/or lowered to such an extent that a potential vehicle occupant is inconvenienced, or such that the vehicle may hit the ground. "Front portion" of the vehicle body may refer to a front section of the vehicle, up to 50 percent of the vehicle's length. Correspondingly, "rear portion" may refer to a rear section of the vehicle, up to 50 percent of the vehicle's length. Furthermore, front and/or rear "portion" of the vehicle body may refer to front and/or rear "section, end and/or part" of the vehicle body. "Vehicle body" may according to one example refer to "vehicle shell". "Performing" a vertical vehicle motion may refer to "conveying and/or initiating" a vertical vehicle motion. The vertical vehicle motion may for instance be provided by means of a hydraulic, a magnetic and/or an air suspension of the vehicle body. The performing of the vertical vehicle motion may be initiated simultaneously with, ahead of, or subsequent initiation of the providing of the light output. Correspondingly, the performing of the vertical vehicle motion may last shorter than, as long as, or longer than the providing of the light output.

Additionally or alternatively, optionally, the intention indicating system may further provide a sound output representing the autonomous kinematic action. Thereby, by additionally providing a sound output reflecting the autonomous kinematic action, said autonomous kinematic action may to even greater extent be signalled in an intuitive and attention grabbing manner, and to further extent be easily noticed by observers such as external observers. That is, different autonomous kinematic actions may be represented by different types of sound outputs, with each respective sound output adapted to in an intuitive and/or human understandable manner signal the type of autonomous kinematic action it represents. A sound output may be of arbitrarily selected frequency, volume, duration etc. as considered suitable to in an intuitive and/or human understandable manner reflect the autonomous kinematic action to which it refer, and may further be represented by for instance beeps, sound signals, jingles etc. Consequently, by additionally communicating the ongoing or upcoming autonomous kinematic action by means of a sound output reflecting the type of the action, said action may be communicated to an observer such as an external observer in an—to even greater extent—improved and intuitive manner, and subsequently, an observer may—to even greater extent—in an improved and intuitive manner perceive, derive and/or judge the ongoing or upcoming autonomous kinematic action and/or the type thereof. The sound output may be provided with support from one or more loudspeakers, which for instance may be distributed in different sections of the vehicle. The sound output may further be directed in different directions depending on where a potential observer may have been detected, and further the volume of the sound output adapted to the distance to said potential observer and/or the surrounding sounds of the vehicle. The sound output may further be directed according to the autonomous kinematic action which it reflects, e.g. directing the sound backwards should the autonomous kinematic action be going rearwards. The providing of the sound output may be initiated simultaneously with, ahead of, or subsequent initiation of the providing of the light output. Correspondingly, the providing of the sound output may last shorter than, as long as, or longer than the providing of the light output.

According to a second aspect of embodiments herein, the object is achieved by an intention indicating system of a vehicle, adapted for indicating to a potential observer an ongoing or impending autonomous kinematic action of the vehicle. The intention indicating system includes an action determining unit adapted for determining an ongoing or impending autonomous kinematic action of the vehicle. The intention indicating system further includes a light output providing unit adapted for providing with support from a light providing device including one or more light sources adapted to emit light, which light providing device is provided continuously and/or intermittently along a majority of a horizontal circumference of the vehicle, a visual light output visible at least from an outside of the vehicle representing the autonomous kinematic action.

Optionally, the light providing device may preferably extend along at least 75 percent, more preferred along at least 85 percent, and most preferred along at least 95 percent of the circumference.

Optionally, the light output providing unit may be adapted to initiate the providing of the light output a predeterminable period of time prior to the autonomous kinematic action starting.

Optionally, the light output providing unit may be adapted such that light output is active for a predeterminable period of time and/or until the autonomous kinematic action is finalized.

Optionally, the autonomous kinematic action may include an acceleration, a deceleration, a lateral movement, a transition from a shut down state to a standstill state, a transition from the standstill state to the shut down state, going rearwards and/or a steady state movement.

Optionally, the intention indicating system may further include an observer determining unit adapted for determining that an observer is in vicinity of the vehicle.

Optionally, the intention indicating system may further include a vertical motion performing unit adapted for performing a vertical vehicle motion representing the autonomous kinematic action, which vertical vehicle motion includes raising and/or lowering a front portion and/or a rear portion of a vehicle body of the vehicle. Additionally or alternatively, the intention indicating system may further include a sound output providing unit adapted for providing a sound output representing the autonomous kinematic action.

Similar advantages as those mentioned in the foregoing in relation to the first aspect correspondingly apply to the second aspect, which is why these advantages are not further discussed.

According to a third aspect of embodiments herein, the object is achieved by a vehicle including an intention indication system as discussed above. Again, similar advantages as those mentioned in the foregoing in relation to the first aspect correspondingly apply to the third aspect, which is why these advantages are not further discussed.

BRIEF DESCRIPTION OF THE DRAWINGS

The various aspects of the non-limiting embodiments of the invention, including particular features and advantages, will be readily understood from the following detailed description and the accompanying drawings, in which.

DESCRIPTION OF EMBODIMENTS

Figure 1:
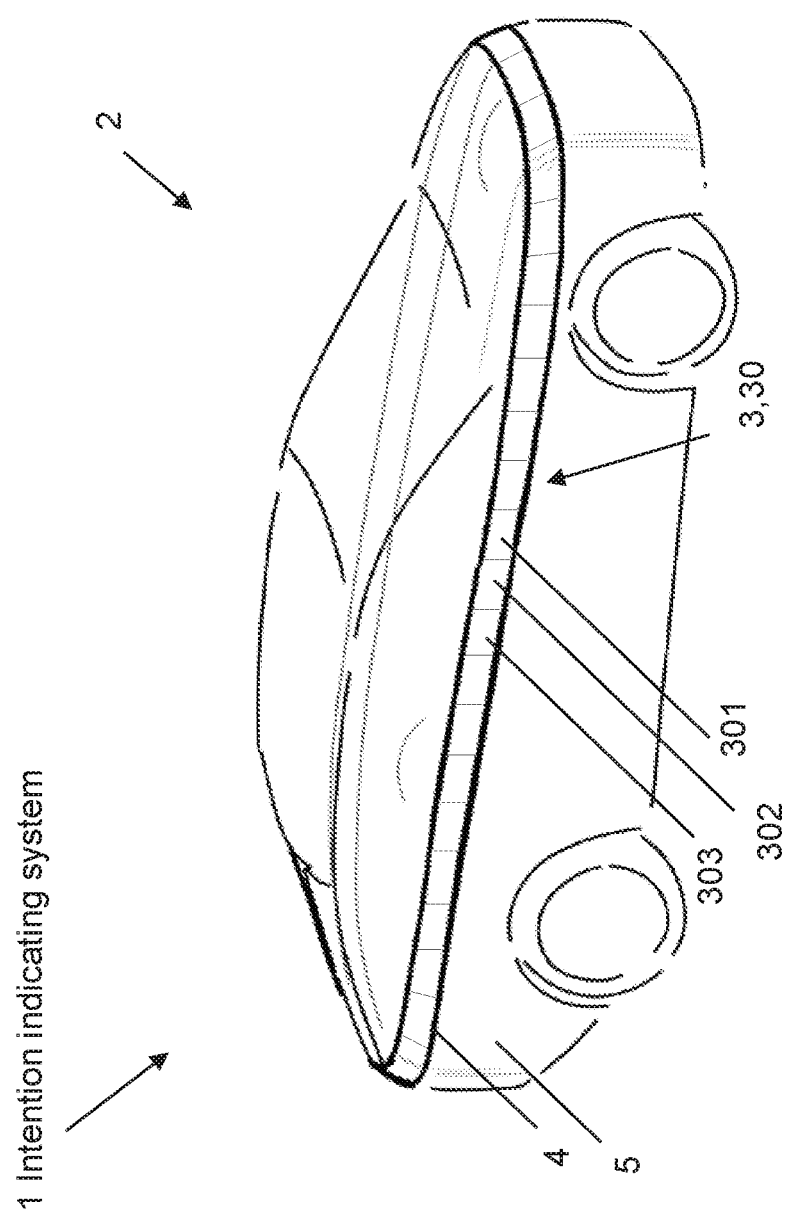
FIG. 1 illustrates a schematic overview of a vehicle with an exemplifying intention indicating system according to embodiments of the disclosure.

The non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to indicating to a potential observer an ongoing or impending autonomous kinematic action of a vehicle, there will be disclosed an approach according to which people—or even other autonomous vehicles and/or systems—near such a vehicle, are enabled to plan their behavior or react to the behaviors of the vehicle.

Referring now to the figures and FIG. 1 in particular, there is illustrated a schematic overview of an exemplifying intention indicating system 1 according to embodiments of the disclosure. The intention indicating system 1 is included in—and/or provided on-board—an at least partly autonomous vehicle 2, here represented by a passenger car. The intention indicating system 1 is adapted for indicating to a potential observer (not shown) an ongoing or impending autonomous kinematic action of the vehicle 1, as will be described in greater detail further on in conjunction with FIG. 3.

The intention indicating system 1 and/or the vehicle 2 includes a light providing device 3 including one or more light sources 30—here a plurality thereof—adapted to emit light visible at least from an outside of the vehicle 2. The light providing device 3 is provided continuously and/or intermittently along a majority of an essentially horizontal circumference 4 of the vehicle 2, here along an exterior and/or interior surface 5 of the vehicle 2. Optionally, the light providing device 3 preferably extends along at least 75 percent, more preferred along at least 85 percent, and most preferred along at least 95 percent of the circumference 4. Here, the light providing device 3 extends along essentially 100% of the circumference 4. The light providing device 3 may according to an example be at least partly visible from an inside of the vehicle 2.

In the shown embodiment, the light providing device 3 includes—on a respective left and right side of the vehicle 2—at least a first 301, a second 302 and a third light source 303, all optional. The first light source 301 is positioned in front of the second light source 302 in a forward direction of the vehicle 2, and the second light source 302 is positioned in front of the third light source 303 in said forward direction. The first 301, the second 302 and the third light source 303 are here respectively each represented by a plurality of light sources (not shown), here LEDs.

As further shown in FIG. 2, which depicts a schematic block diagram illustrating an exemplifying intention indicating system 1 according to embodiments of the disclosure, the intention indicating system 1 includes an optional observer determining unit 100, an action determining unit 101, a light output providing unit 102, an optional vertical motion performing unit 103 and an optional sound output providing unit 104, all of which will be described in greater detail in conjunction with FIG. 3. Furthermore, the embodiments herein for indicating to a potential observer an ongoing or impending autonomous kinematic action of a vehicle 2, may be implemented through one or more processors, such as a processor 105, here denoted CPU, together with computer program code for performing the functions and actions of the embodiments herein. Said program code may also be provided as a computer program product, for instance in the form of a data carrier carrying computer program code for performing the embodiments herein when being loaded into the intention indicating system 1. One such carrier may be in the form of a CD ROM disc. It is however feasible with other data carriers such as a memory stick. The computer program code may furthermore be provided as pure program code on a server and downloaded to the intention indicating system 1. The intention indicating system 1 may further include a memory 106 including one or more memory units. The memory 106 may be arranged to be used to store e.g. information, and further to store data, configurations, schedulings, and applications, to perform the methods herein when being executed in the intention indicating system 1. For instance, the computer program code may be implemented in the firmware, stored in FLASH memory 106, of an embedded processor 105.

Furthermore, the optional observer determining unit 100, the action determining unit 101, the light output providing unit 102, the optional vertical motion performing unit 103, the optional sound output providing unit 104, the optional processor 105 and/or the optional memory 106 may at least partly be included in the vehicle 2—for instance in one or more nodes 107 thereof such as electronic control units (ECUs). Those skilled in the art will also appreciate that said units 100, 101, 102, 103, 104 described above, and which will be described in more detail later on in this description, may refer to a combination of analog and digital circuits, and/or one or more processors configured with software and/or firmware, e.g. stored in a memory such as the memory 106, that when executed by the one or more processors such as the processor 105 perform as will be described in more detail in conjunction with FIG. 3. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Figure 2:
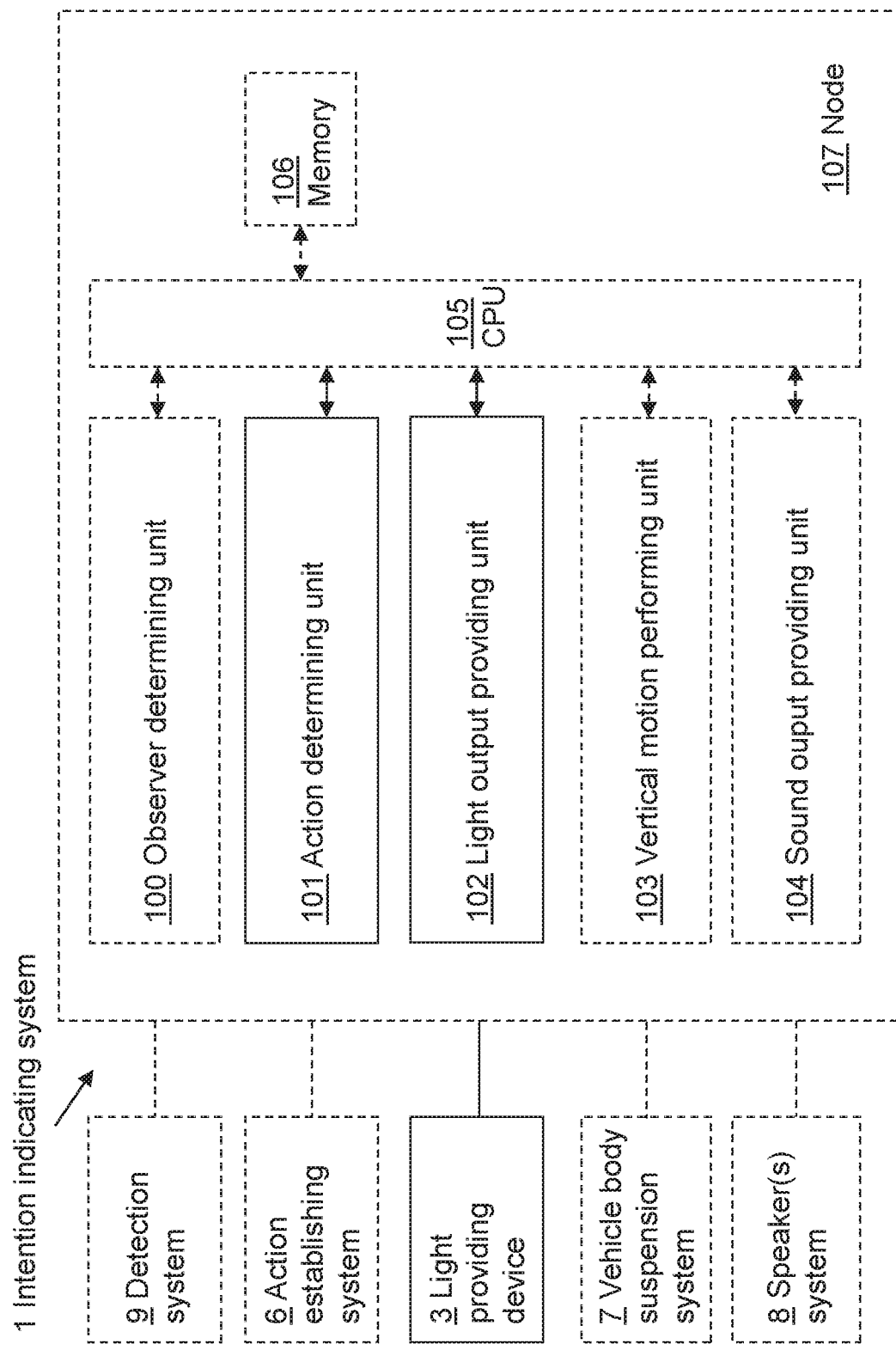
FIG. 2 is a schematic block diagram illustrating an exemplifying intention indicating system according to embodiments of the disclosure.

Further shown in FIG. 2 is an optional action establishing system 6, which may support establishment of current and upcoming autonomous kinematic actions of the vehicle 2. The action establishing system 6 may refer to systems commonly known in the art for determining autonomous kinematic actions, and may for instance include detection sensors, decision algorithms etc. Further shown is an optional vehicle body suspension system 7, an optional speaker(s) system 8, and an optional detection system 9. The detection sensor system 9 may include one or more commonly known detection sensors, such as e.g. a camera, radar, laser, lidar, IR sensor, sound sensor etc., adapted for sensing presence of e.g. a human and/or another vehicle. The vehicle body suspension system 7 may support vertical vehicle motions—i.e. raising and lowering—of a vehicle body front or rear or both thereof, and is here represented by a hydraulic, magnetic and/or air suspension system. The speaker(s) system 8, on the other hand, may support sound outputs, and is here represented by a plurality of speakers distributed in different sections of the vehicle 2. The optional vertical vehicle motions and optional sound outputs will be further described below.

Figure 3:
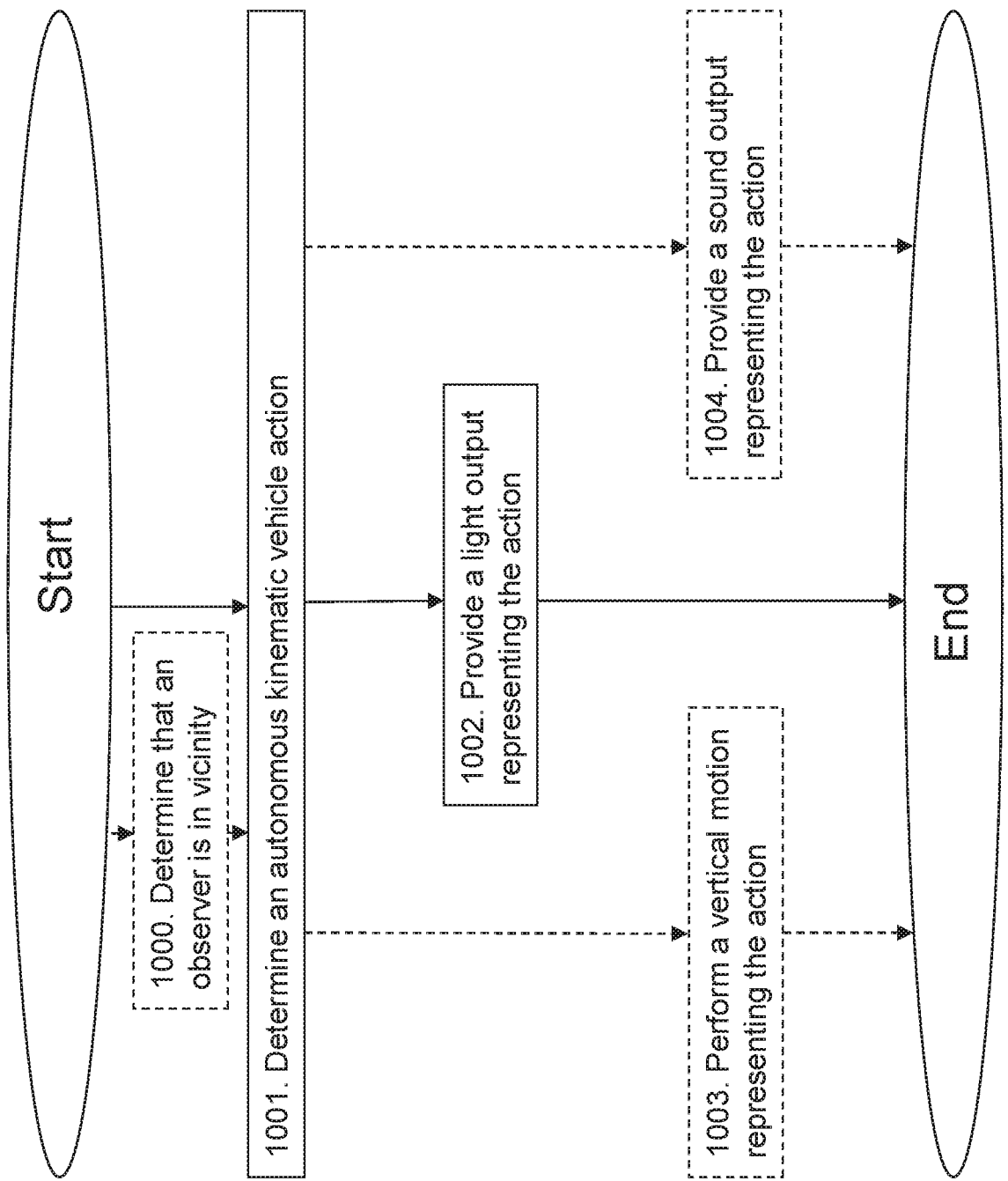
FIG. 3 is a flowchart depicting an exemplifying method according to embodiments of the disclosure, for indicating to a potential observer an ongoing or impending autonomous kinematic action of a vehicle.

FIG. 3 is a flowchart depicting an exemplifying method according to embodiments of the disclosure for indicating to a potential observer an ongoing or impending autonomous kinematic action of a vehicle 2. The exemplifying method, which may be continuously repeated, includes the following actions discussed with support from essentially FIGS. 1 and 2, and to some extent FIG. 4. The actions may be taken in any suitable order, for instance may Actions 1000 and 1001 alternatively be performed simultaneously or in a reverse order, and/or may Actions 1002, 1003 and 1004 be performed simultaneously.

Action 1000

In optional Action 1000, the intention indicating system 1 may determine—e.g. by means of the observer determining unit 100—that an observer is in vicinity of the vehicle 2. Thus, according to this optional scenario and as shown with support from FIGS. 1-2, the intention indicating system 1 only proceeds to Action 1001 and/or Action 1002 which will be further described below, when it is determined—e.g. with support from the optional detection system 9—that someone is near the vehicle 2.

Action 1001

In Action 1001, the intention indicating system 1 determines—e.g. by means of the action determining unit 101—an ongoing or impending autonomous kinematic action of the vehicle 2. Thus, as shown with support from FIGS. 1-2, it is established that there is a current or upcoming autonomous intention of the vehicle 2, for instance determined with support from the optional action establishing system 6.

Action 1002

In Action 1002, the intention indicating system 1 provides—e.g. by means of the light output providing unit 102—with support from a light providing device 3 including one or more light sources 30 adapted to emit light, which light providing device 3 is provided continuously and/or intermittently along a majority of a horizontal circumference 4 of the vehicle 2, a visual light output visible at least from an outside of the vehicle 2 representing the autonomous kinematic action.

Thus, as shown with support from FIGS. 1-2, with the light providing device 3 extending along at least a substantial portion of the vehicle's circumference 4, said light providing device 3 may be viewable from essentially all horizontal angles, such as from around 360 degrees of the vehicle 2, i.e. the light providing device 3 may be observable to an observer viewing the vehicle 2 from essentially any direction, such as e.g. from the front, back and any of the sides thereof. Accordingly, light outputs associated with autonomous kinematic actions may be more easily noticed by observers, which is a clear advantage over prior art technology for which many angles are hidden. Furthermore, with the light providing device 3 including one or more light sources 30 and extending along at least a substantial portion of the vehicle's circumference 4, a greater variety of light output combinations representing different autonomous kinematic actions may be supported. That is, different autonomous kinematic actions may be represented by different types of light outputs, with each respective light output adapted to in an intuitive and/or human understandable manner signal the type of autonomous kinematic action it represents. Consequently, with the inventive concept, an ongoing or upcoming autonomous kinematic action may be communicated to an observer in an improved and intuitive manner, and subsequently, an observer may in an improved and intuitive manner perceive, derive and/or judge the ongoing or upcoming autonomous kinematic action and/or the type thereof.

Optionally, the autonomous kinematic action may include an acceleration. The light output may then include light emission from one or more light sources 30 of the light providing device 3 as considered appropriate to signal "increasing speed". According to an example, the light output may include light emission from the first light source 301 at a first time instant, light emission from the second light source 302 at a second time instant subsequent the first time instant, and light emission from the third light source 303 at a third time instant subsequent the second time instant. Thus, as shown with support from at least FIG. 1; with the at least first 301, second 302 and third light sources 303 emitting light in this specified order—which may be perceived as the light output moving in a backward direction of the vehicle 2—the autonomous kinematic action of vehicle acceleration may be communicated to an observer in an intuitive and easily viewable manner.

Additionally or alternatively, optionally, the autonomous kinematic action may include a deceleration. The light output may then include light emission from one or more light sources 30 of the light providing device 3 as considered appropriate to signal "decreasing speed and/or slowing down". According to another example, correspondingly, the light output may include light emission from the third light source 303 at a first time instant, light emission from the second light source 302 at a second time instant subsequent the first time instant, and light emission from the first light source 301 at a third time instant subsequent the second time instant. Thus, as shown with support from at least FIG. 1; with the at least first 301, second 302 and third light sources 303 emitting light in this specified order—which may be perceived as the light output moving in a forward direction of the vehicle 2—the autonomous kinematic action of vehicle deceleration may be communicated to an observer in an intuitive and easily viewable manner.

Additionally or alternatively, optionally, the autonomous kinematic action may include a lateral movement. According to an example, when the autonomous kinematic action includes a lateral movement to the left, the light output may then include light emission from one or more light sources 30 of the light providing device 3 on the left side of the vehicle 2. Thus, as shown with support from at least FIG. 1, with the light providing device 3 emitting light on the vehicle's 2 left side, the autonomous kinematic action of the vehicle 2 turning left and/or e.g. changing to a lane to the left, may be communicated to an observer in an intuitive and easily viewable manner. Correspondingly, optionally, when the autonomous kinematic action includes a lateral movement to the right, the light output may then include light emission from one or more light sources 30 of the light providing device on the right side of the vehicle 2. Thus, as shown with support from at least FIG. 1, with the light providing device 3 emitting light on the vehicle's 2 right side, the autonomous kinematic action of the vehicle 2 turning right and/or e.g. changing to a lane to the right, may be communicated to an observer in an intuitive and easily viewable manner.

Additionally or alternatively, optionally, the autonomous kinematic action may include a transition from a shut down state to a standstill state. According to an example, the light output may then include light emission from one or more light sources 30 of the light providing device 3 as considered appropriate to imitate and/or resemble a behaviour of "waking up". For instance, the light output may include light emitted in a pulsating manner, such as to imitate heartbeats and or breathing, for instance pulsating with an increasing pace. Alternatively, light may be emitted such as the light output appears to wander around the vehicle 2, for instance with increasing pace. Thus, as shown with support from at least FIG. 1, the autonomous kinematic action of the vehicle 2 transitioning from a shut down state to a standstill state may be communicated to an observer in an intuitive and easily viewable manner.

Additionally or alternatively, optionally, the autonomous kinematic action may include a transition from the standstill state to the shut down state. According to an example, the light output may then include light emission from one or more light sources 30 of the light providing device 3 as considered appropriate to imitate a behaviour of "going to sleep". For instance, the light output may include light emitted in a pulsating manner, such as to imitate heartbeats and or breathing, for instance pulsating with a decreasing pace such as to imitate and/or resemble falling asleep. Alternatively, light may be emitted such as the light output appears to wander around the vehicle 2, for instance with decreasing pace. Thus, as shown with support from at least FIG. 1, the autonomous kinematic action of the vehicle 2 transitioning from the standstill state to the shut down state may be communicated to an observer in an intuitive and easily viewable manner.

Additionally or alternatively, optionally, the autonomous kinematic action may include going rearwards. According to an example, the light output may then include light emission from one or more light sources 30 of the light providing device 3 as considered appropriate to signal a "backing up warning". For instance, the light output may include light emitted in a blinking manner, such as to imitate and/or resemble a warning. Thus, as shown with support from at least FIG. 1, the autonomous kinematic action of the vehicle 2 going rearwards may be communicated to an observer in an intuitive and easily viewable manner.

Additionally or alternatively, optionally, the autonomous kinematic action may include a steady state movement. According to an example, the light output may then include light emission from one or more light sources 30 of the light providing device 3 as considered appropriate to signal "unchanged driving circumstances". For instance, the light output may include emitting a continuous soft and/or low intensity light, such as to signal a non-changing driving situation. Thus, as shown with support from at least FIG. 1, the autonomous kinematic action of the vehicle 2 in steady state movement may be communicated to an observer in an intuitive and easily viewable manner.

Optionally, the providing of the light output may be initiated a predeterminable period of time prior to the autonomous kinematic action starting. Correspondingly, the light output providing unit 102 may be adapted for initiating the providing of the light output a predeterminable period of time prior to the autonomous kinematic action starting. Thus, as shown with support from at least FIGS. 1-2, the autonomous kinematic action may be initiated to be communicated ahead of time, i.e. prior to the vehicle 2 actually starting to perform said action. This gives an observer advance information of the action, and enables said observer to plan his or her behavior and/or react to the behaviors of the autonomous vehicle 2 ahead of time.

Optionally, the light output may be active for a predeterminable period of time and/or until the autonomous kinematic action is finalized. Correspondingly, the light output providing unit 102 may be adapted such that the light output is active for a predeterminable period of time and/or until the autonomous kinematic action is finalized. Thus, as shown with support from at least FIGS. 1-2, the autonomous kinematic action may be communicated either during a selected period of time or until said action no longer is active and/or relevant. This gives an observer information about the action during a sufficient time period, and enables said observer to plan his or her behavior and/or react to behaviors of the autonomous vehicle 2 accordingly.

Action 1003

Figure 4:
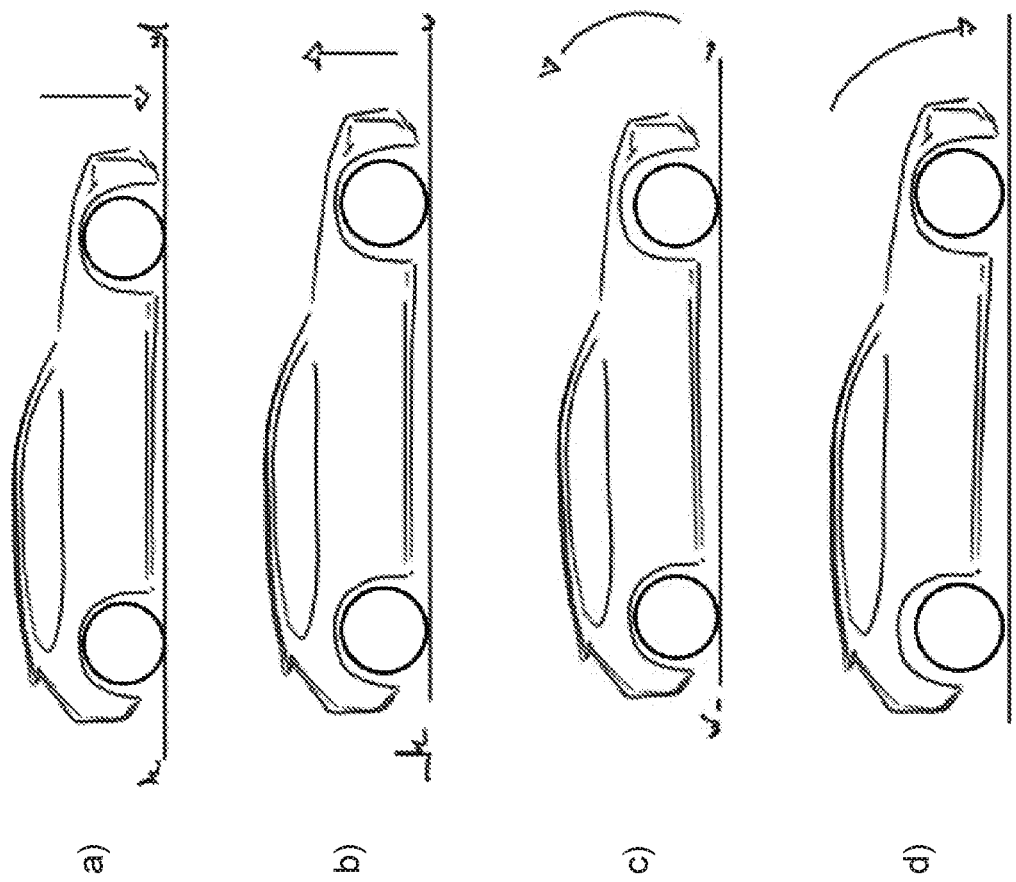
FIG. 4 illustrates a schematic overview of exemplifying optional vehicle vertical motions according to embodiments of the disclosure.

In optional Action 1003, the intention indicating system 1 may—e.g. by means of the optional vertical motion performing unit 103—perform a vertical vehicle motion representing the autonomous kinematic action, which vertical vehicle motion includes raising and/or lowering a front portion and/or a rear portion of a vehicle body of the vehicle 2. Thus, as shown with support from at least FIG. 4, which illustrates a schematic overview of exemplifying optional vehicle vertical motions according to embodiments of the disclosure, by additionally raising and/or lowering a front portion and/or a rear portion of a vehicle body of the vehicle 2 in a manner reflecting the autonomous kinematic action, said autonomous kinematic action may to even greater extent be signalled in an intuitive and attention grabbing manner, and to even further extent be easily noticed by observers. The vertical vehicle motion may, for instance, when the autonomous kinematic action includes a transition from the standstill state to the shut down state, include lowering the vehicle body front portion and rear portion, as shown in FIG. 4a. Additionally or alternatively, the vertical vehicle motion may, when the autonomous kinematic action includes a transition from the shut down state to the standstill state, include raising the vehicle body front portion and rear portion, as shown in FIG. 4b. Additionally or alternatively, the vertical vehicle motion may, when the autonomous kinematic action includes an acceleration, include raising the front portion and/or lowering the rear portion, as shown in FIG. 4c. Additionally or alternatively, the vertical vehicle motion may, when the autonomous kinematic action includes a deceleration, include lowering the front portion and/or raising the rear portion, as shown in FIG. 4d. The vertical vehicle motion may for instance be provided with support from the vehicle body suspension system 7 shown in FIG. 2.

Action 1004

In optional Action 1004, the intention indicating system 1 may—e.g. by means of the optional sound output providing unit 104—provide a sound output representing the autonomous kinematic action. Thus, as shown with support from at least FIG. 2, by additionally providing a sound output reflecting the autonomous kinematic action, said autonomous kinematic action may to even greater extent be signalled in an intuitive and attention grabbing manner, and to further extent be easily noticed by observers. The sound output may for instance be provided with support from the speaker(s) system shown in FIG. 2.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by an intention indicating system of a vehicle, for indicating to a potential observer an ongoing or impending autonomous kinematic action of said vehicle, said method comprising:
    determining the ongoing or impending autonomous kinematic action of said vehicle; and providing with support from a light providing device comprising one or more light sources adapted to emit light, which light providing device is provided continuously or intermittently along a majority of a horizontal circumference of said vehicle, a visual light output visible at least from an outside of said vehicle representing said autonomous kinematic action,
    wherein said light providing device extends along at least 75 percent of said circumference.

2. The method according to claim 1, wherein said light providing device extends along at least 95 percent of said circumference.

3. The method according to claim 1, wherein said providing the light output is initiated a predeterminable period of time prior to said autonomous kinematic action starting.

4. The method according to claim 1, wherein said light output is active for a predeterminable period of time or until said autonomous kinematic action is finalized.

5. The method according to claim 1, wherein said autonomous kinematic action comprises:
    an acceleration; a deceleration; a lateral movement; a transition from a shut down state to a standstill state; a transition from said standstill state to said shut down state; going rearwards; or a steady state movement.

6. The method according to claim 1, further comprising: determining that an observer is in vicinity of said vehicle.

7. The method according to claim 1, further comprising:
    performing a vertical vehicle motion representing said autonomous kinematic action, said vertical vehicle motion comprising raising or lowering a front portion or a rear portion of a vehicle body of said vehicle; or
    providing a sound output representing said autonomous kinematic action.

8. An intention indicating system of a vehicle, adapted for indicating to a potential observer an ongoing or impending autonomous kinematic action of said vehicle, said intention indicating system comprising:
    an action determining unit adapted for determining the ongoing or impending autonomous kinematic action of said vehicle; and
    a light output providing unit adapted for providing with support from a light providing device comprising one or more light sources adapted to emit light, which light providing device is provided continuously and/or intermittently along a majority of a horizontal circumference of said vehicle, a visual light output visible at least from an outside of said vehicle representing said autonomous kinematic action,
    wherein said light providing device extends along at least 75 percent of said circumference.

9. The intention indicating system according to claim 8, wherein said light providing device extends along at least 95 percent of said circumference.

10. The intention indicating system according to claim 8, wherein said light output providing unit is adapted to initiate said providing of the light output a predeterminable period of time prior to said autonomous kinematic action starting.

11. The intention indicating system according to claim 8, wherein said light output providing unit is adapted such that the light output is active for a predeterminable period of time or until said autonomous kinematic action is finalized.

12. The intention indicating system according to claim 8, wherein said autonomous kinematic action comprises: an acceleration; a deceleration; a lateral movement; a transition from a shut down state to a standstill state; a transition from said standstill state to said shut down state; going rearwards; or a steady state movement.

13. The intention indicating system according to claim 8, further comprising:
    an observer determining unit adapted for determining that an observer is in vicinity of said vehicle.

14. The intention indicating system according to claim 8, further comprising:
    a vertical motion performing unit adapted for performing a vertical vehicle motion representing said autonomous kinematic action, said vertical vehicle motion comprising raising or lowering a front portion or a rear portion of a vehicle body of said vehicle; or
    a sound output providing unit adapted for providing a sound output representing said autonomous kinematic action.

15. A vehicle comprising the intention indicating system according to claim 8.

\* \* \* \* \*